United States Patent
Stanek et al.

(10) Patent No.: US 8,831,808 B2
(45) Date of Patent: Sep. 9, 2014

(54) CONTROLLED SHUTDOWN OF AN ELECTRIC VEHICLE

(75) Inventors: Joseph Stanek, Northville, MI (US); Jeffery R. Grimes, Canton, MI (US); William David Treharne, Ypsilanti, MI (US); Ryan Skaff, Farmington Hills, MI (US); Brian Gillespey, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 13/404,101

(22) Filed: Feb. 24, 2012

(65) Prior Publication Data

US 2013/0226377 A1 Aug. 29, 2013

(51) Int. Cl.
*B60W 10/26* (2006.01)
*B60L 11/18* (2006.01)

(52) U.S. Cl.
USPC .............................. 701/22; 180/65.1; 320/132

(58) Field of Classification Search
CPC ............ Y02T 10/7038; Y02T 10/7044; Y02T 10/7283; B60W 10/26; B60W 2510/244; B60W 2710/244; B60L 11/126; B60L 11/1862; B60L 15/2045
USPC ............ 701/22; 903/902; 180/65.1; 318/139, 318/434; 340/425.5; 320/132
See application file for complete search history.

(56) References Cited

U.S. PATENT DOCUMENTS

| | | | | |
|---|---|---|---|---|
| 5,227,703 A * | 7/1993 | Boothe et al. | ................. | 318/139 |
| 5,291,960 A * | 3/1994 | Brandenburg et al. | .... | 180/65.27 |
| 5,726,541 A * | 3/1998 | Glenn et al. | ..................... | 318/16 |
| 6,026,921 A * | 2/2000 | Aoyama et al. | ............ | 180/65.25 |
| 6,242,873 B1 * | 6/2001 | Drozdz et al. | ................ | 318/139 |
| 6,763,298 B2 * | 7/2004 | Boggs et al. | ..................... | 701/112 |
| 6,882,913 B2 * | 4/2005 | Bullister et al. | ................ | 701/41 |
| 6,885,920 B2 * | 4/2005 | Yakes et al. | ..................... | 701/22 |
| 7,073,615 B2 * | 7/2006 | Mack | ....................... | 180/65.235 |
| 7,184,866 B2 * | 2/2007 | Squires et al. | ............... | 701/29.3 |
| 7,254,468 B2 * | 8/2007 | Pillar et al. | ..................... | 701/22 |
| 7,275,610 B2 * | 10/2007 | Kuang et al. | ............. | 180/65.265 |
| 7,302,320 B2 * | 11/2007 | Nasr et al. | ....................... | 701/22 |
| 7,689,332 B2 * | 3/2010 | Yakes et al. | ..................... | 701/22 |
| 7,711,460 B2 * | 5/2010 | Yakes et al. | ..................... | 701/22 |
| 8,004,234 B2 * | 8/2011 | Walrath | ....................... | 320/107 |
| 8,138,720 B2 * | 3/2012 | Snyder et al. | ................. | 320/127 |
| 2004/0148075 A1 * | 7/2004 | Bullister et al. | ................ | 701/41 |
| 2006/0058932 A1 * | 3/2006 | Garg et al. | ....................... | 701/29 |
| 2006/0186738 A1 * | 8/2006 | Noguchi et al. | ............. | 307/10.1 |
| 2009/0184686 A1 * | 7/2009 | Owens et al. | ................. | 320/136 |
| 2009/0259356 A1 * | 10/2009 | Clark et al. | ..................... | 701/22 |
| 2010/0065361 A1 * | 3/2010 | Nam et al. | ..................... | 180/211 |
| 2010/0145559 A1 * | 6/2010 | Gauthier et al. | ................ | 701/22 |
| 2011/0095765 A1 * | 4/2011 | Tae et al. | ....................... | 324/434 |

(Continued)

*Primary Examiner* — Fadey Jabr
*Assistant Examiner* — Courtney Heinle
(74) *Attorney, Agent, or Firm* — David B. Kelley; Brooks Kushman P.C.

(57) ABSTRACT

A vehicle is provided with a motor that is configured to provide drive torque and to facilitate regenerative braking. The vehicle also includes a controller that is configured to receive input that is indicative of a vehicle speed and a battery state of charge (BSOC), and to disable the drive torque when the BSOC is less than a maximum discharge limit. The controller is also configured to activate regenerative braking when the BSOC is less than the maximum discharge limit and the vehicle speed is greater than a predetermined speed.

20 Claims, 5 Drawing Sheets

(56) References Cited

U.S. PATENT DOCUMENTS

2011/0208378 A1\* 8/2011 Krueger et al. ............... 701/22
2011/0264317 A1\* 10/2011 Druenert et al. ............... 701/22
2011/0320830 A1\* 12/2011 Ito ............................... 713/300
2013/0241498 A1\* 9/2013 Koebler ........................ 320/135

\* cited by examiner

CONTROLLED SHUTDOWN OF AN ELECTRIC VEHICLE

TECHNICAL FIELD

One or more embodiments relate to a vehicle system and method for controlling shutdown of an electric vehicle at low battery power.

BACKGROUND

The term "electric vehicle" as used herein, includes vehicles having an electric motor for vehicle propulsion, such as battery electric vehicles (BEV), hybrid electric vehicles (HEV), and plug-in hybrid electric vehicles (PHEV). A BEV includes an electric motor, wherein the energy source for the motor is a battery that is re-chargeable from an external electric grid. In a BEV, the battery is the source of energy for vehicle propulsion. A HEV includes an internal combustion engine and an electric motor, wherein the energy source for the engine is fuel and the energy source for the motor is a battery. In a HEV, the engine is the main source of energy for vehicle propulsion with the battery providing supplemental energy for vehicle propulsion (the battery buffers fuel energy and recovers kinematic energy in electric form). A PHEV is like a HEV, but the PHEV has a larger capacity battery that is rechargeable from the external electric grid. In a PHEV, the battery is the main source of energy for vehicle propulsion until the battery depletes to a low energy level, at which time the PHEV operates like a HEV for vehicle propulsion.

The electric vehicle monitors the status of the battery using a number of measurements, including battery state of charge (BSOC). BSOC is a percentage that represents the amount of energy in the battery from 0% (empty) to 100% (full). Batteries may be damaged if they are overcharged or overly discharged. Therefore, many prior art electric vehicles maintain the battery within an operating range between a charging limit of approximately 80% BSOC and a discharge limit of approximately 20% BSOC.

SUMMARY

In one embodiment, a vehicle is provided with a motor that is configured to provide drive torque and to facilitate regenerative braking. The vehicle also includes a controller that is configured to receive input that is indicative of a vehicle speed and a battery state of charge (BSOC), and to disable the drive torque when the BSOC is less than a maximum discharge limit. The controller is also configured to activate regenerative braking when the BSOC is less than the maximum discharge limit and the vehicle speed is greater than a predetermined speed.

In another embodiment, a vehicle system is provided with a controller that is configured to receive input indicative of a vehicle speed and a battery state of charge (BSOC), and to disable drive torque when the BSOC is less than a maximum discharge limit. The controller is also configured to disable electric braking assistance and electric steering assistance when the BSOC is less than the maximum discharge limit and the vehicle speed is less than a predetermined speed.

In yet another embodiment, a method is provided for controlled shutdown of an electric vehicle. Input is received that is indicative of a vehicle speed and a battery state of charge (BSOC). Drive torque is disabled when the BSOC is less than a first discharge limit. Regenerative braking is activated when the BSOC is less than the first discharge limit and the vehicle speed is greater than the predetermined speed.

The disclosed vehicle system provides advantages by allowing the electric vehicle to operate below the discharge limit which extends the battery range. The vehicle system controls the shutdown of the electric vehicle once the BSOC is less than a maximum discharge limit by disabling vehicle propulsion systems and activating regenerative braking to provide energy for electric braking assistance and electric steering assistance.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
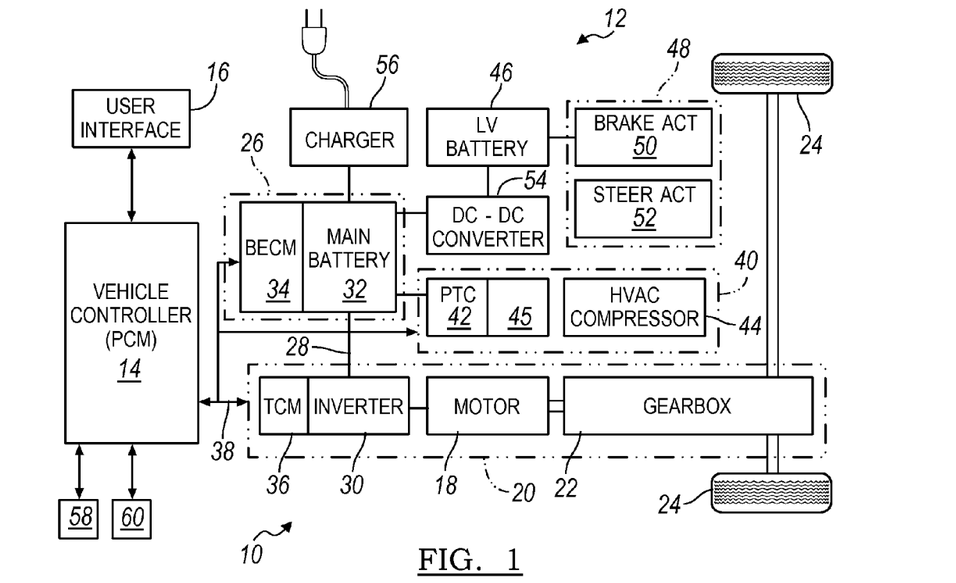
FIG. 1 is a schematic diagram of a vehicle system for controlling the shutdown of an electric vehicle according to one or more embodiments.

With reference to FIG. 1, a vehicle system for controlling the shutdown of an electric vehicle is illustrated in accordance with one or more embodiments and is generally referenced by numeral 10. The vehicle system 10 is depicted within a vehicle 12. The vehicle system 10 includes a vehicle controller 14 and a user interface 16 that are in communication with each other. The vehicle controller 14 receives input signals and controls the shutdown of the vehicle 12. The vehicle controller 14 transmits this information to the user interface 16, which in turn conveys the information to the driver in real time. The driver may use this information as a warning, and prepares for shutdown by maneuvering the vehicle 12 to a suitable parking location.

The illustrated embodiment depicts the vehicle 12 as a battery electric vehicle (BEV), which is an all-electric vehicle propelled by an electric motor 18 without assistance from an internal combustion engine (not shown). The motor 18 receives electrical power and provides drive torque for vehicle propulsion. The motor 18 also functions as a generator for converting mechanical power into electrical power through regenerative braking. The vehicle 12 has a powertrain 20 that includes the motor 18 and a gearbox 22. The gearbox 22 adjusts the drive torque and speed of the motor 18 by a predetermined gear ratio. A pair of half-shafts extend in opposing directions from the gearbox 22 to a pair of driven wheels 24.

Although illustrated and described in the context of a BEV 12, it is understood that embodiments of the present application may be implemented on other types of electric vehicles, such as those powered by an internal combustion engine in addition to one or more electric machines (e.g., hybrid electric vehicles (HEVs), full hybrid electric vehicles (FHEVs) and plug-in electric vehicles (PHEVs), etc.).

The vehicle 12 includes an energy storage system 26 for storing and controlling electrical energy. A high voltage bus 28 electrically connects the motor 18 to the energy storage system 26 through an inverter 30. The energy storage system 26 includes a main battery 32 and a battery energy control module (BECM) 34 according to one or more embodiments. The main battery 32 is a high voltage battery that is capable of outputting electrical power to operate the motor 18. The main battery 32 also receives electrical power from the motor 18, when the motor 18 is operating as a generator during regenerative braking. The inverter 30 converts the direct current (DC) power supplied by the main battery 32 to alternating current (AC) power for operating the motor 18. The inverter 30 also converts alternating current (AC) provided by the motor 18, when acting as a generator, to DC for charging the main battery 32. The main battery 32 is a battery pack made up of several battery modules (not shown), where each battery module contains a plurality of battery cells (not shown). The BECM 34 acts as a controller for the main battery 32. The BECM 34 also includes an electronic monitoring system that manages temperature and state of charge of each of the battery cells. Other embodiments of the vehicle 12 contemplate different types of energy storage systems, such as capacitors and fuel cells (not shown).

The powertrain 20 includes a traction control module (TCM) 36 for controlling the motor 18 and the inverter 30. The TCM 36 monitors, among other things, the position, speed, and power consumption of the motor 18 and provides output signals corresponding to this information to other vehicle systems. The TCM 36 and the inverter 30 convert the direct current (DC) voltage supply by the main battery 32 into alternating current (AC) signals that are used to control the motor 18.

The vehicle controller 14 communicates with other vehicle systems and controllers for coordinating their function. Although it is shown as a single controller, the vehicle controller 14 may include multiple controllers that may be used to control multiple vehicle systems according to an overall vehicle system control (VSC) logic, or software. For example, the vehicle controller 14 may be a powertrain control module (PCM) having a portion of the VSC software embedded therein. The vehicle controller 14 generally includes any number of microprocessors, ASICs, ICs, memory (e.g., FLASH, ROM, RAM, EPROM and/or EEPROM) and software code to co-act with one another to perform a series of operations. The vehicle controller 14 also includes predetermined data, or "look up tables" that are based on calculations and test data and stored within the memory. The vehicle controller 14 communicates with other controllers (e.g., TCM 36, BECM 34) over a hardline vehicle connection 38 using a common bus protocol (e.g., CAN).

The user interface 16 communicates with the vehicle controller 14 for receiving information regarding the vehicle 12 and its surroundings, and conveys this information to the driver. The user interface 16 includes a number of interfaces, such as gauges, indicators, and displays (shown in FIG. 8). The user interface 16 also includes a controller (not shown) for communicating with external devices, such as a computer or cellular phone in one or more embodiments. The vehicle controller 14 provides output to the user interface 16, such as a status of the motor 18 or battery 32, which is conveyed visually to the driver.

The vehicle 12 includes a climate control system 40 for heating and cooling various vehicle components and a passenger compartment (not shown). The climate control system 40 includes a high voltage positive temperature coefficient (PTC) electric heater 42 and a high voltage electric HVAC compressor 44, according to one or more embodiments. The PTC heater 42 and HVAC compressor 44 are used to heat and cool fluid, respectively, that circulates to the powertrain 20 and to the main battery 32. Both the PTC heater 42 and the HVAC compressor 44 may draw electrical energy directly from the main battery 32. The climate control system 40 includes a climate controller 45 for communicating with the vehicle controller 14 over the CAN bus 38. The on/off status of the climate control system 40 is communicated to the vehicle controller 14, and can be based on, for example, the status of an operator actuated switch, or the automatic control of the climate control system 40 based on related functions, such as window defrost. In other embodiments, the climate control system 40 is configured for heating and cooling air (e.g., existing vehicle cabin air) rather than fluid, and circulating the air through the battery 32 and/or powertrain 20.

The vehicle 12 includes a secondary low voltage (LV) battery 46, such as a 12-volt battery, according to one embodiment. The secondary battery 46 may be used to power various vehicle accessories 48 such as an electric braking actuator 50 and an electric steering actuator 52.

A DC-to-DC converter 54 is electrically connected between the main battery 32 and the LV battery 46. The DC-to-DC converter 54 adjusts, or "steps down" the voltage level to allow the main battery 32 to charge the LV battery 46. A low voltage bus electrically connects the DC-to-DC converter 54 to the LV battery 46 and the accessories 48.

The vehicle 12 includes an AC charger 56 for charging the main battery 32. An electrical connector connects the AC charger 56 to an external power supply (not shown) for receiving AC power. The AC charger 56 includes power electronics used to invert, or "rectify" the AC power received from the external power supply to DC power for charging the main battery 32. The AC charger 56 is configured to accommodate one or more conventional voltage sources from the external power supply (e.g., 110 volt, 220 volt, etc.). The external power supply may include a device that harnesses renewable energy, such as a photovoltaic (PV) solar panel, or a wind turbine (not shown).

Also shown in FIG. 1 are simplified schematic representations of a driver controls system 58 and a navigation system 60. The driver controls system 58 includes acceleration, braking, steering and gear selection (shifting) systems (all generally referenced by numeral 58).

The acceleration system includes an accelerator pedal having one or more sensors, which provides pedal position information that corresponds to a driver request for drive torque.

The braking system includes a brake pedal, a booster, a master cylinder, as well as a mechanical connection to the vehicle wheels, such as the primary driven wheels 24, to effect friction braking. The braking system also includes the electric braking actuator 50 which assists friction braking by adjusting internal pressure within the booster or master cylinder. If electrical power to the electric braking actuator 50 were disrupted, then the mechanical connections within the braking system would engage and allow for mechanical (unassisted) friction braking. The braking system also includes position sensors, pressure sensors, or some combination thereof for providing information such brake pedal position that corresponds to a driver request for brake torque.

The braking system also includes a brake controller (not shown) that communicates with the vehicle controller 14 to coordinate regenerative braking and friction braking. The brake controller provides an input signal to the vehicle controller 14 that corresponds to a total brake torque value. The total brake torque value is based on the accelerator pedal position and the brake pedal position. The vehicle controller 14 then compares the total brake torque value to other information to determine a regenerative braking torque value and a friction braking torque value, where the sum of the regenerative braking torque value and the friction braking torque value is approximately equal to the total brake torque value. The vehicle controller 14 provides the regenerative braking torque value to the TCM 36, which in turn controls the motor 18 to provide regenerative braking. The vehicle controller also provides the friction braking torque value to the brake controller, which in turn controls the electric braking actuator 50 to provide friction braking.

In one or more embodiments, the braking system is configured to provide compression braking of the vehicle. Compression braking represents the frictional losses within an engine of a conventional vehicle, when a driver releases the accelerator pedal. Similarly, the braking system provides a total brake torque value when the accelerator pedal is released, even if the brake pedal is not depressed. The vehicle controller 14 then compares the total brake torque value to other information to determine a regenerative braking torque value and a friction braking torque value.

The vehicle 12 utilizes regenerative braking as the primary braking source, and supplements with friction braking when there is insufficient available regenerative braking torque to satisfy the total brake torque requested by the driver. Regenerative braking recharges the main battery 32 and recovers much of the energy that would otherwise be lost as heat during friction braking. Therefore regenerative braking improves the overall efficiency or fuel economy of the vehicle as compared to vehicles that are only configured for friction braking.

The steering system includes the electric steering actuator 52 which assists mechanical steering. If electrical power to the electric steering actuator 52 were disrupted, then the mechanical connections within the steering system would engage and allow for mechanical (unassisted) steering.

The gear selection system includes a shifter for manually selecting a gear setting of the gearbox 22. The gear selection system may include a shift position sensor for providing shifter selection information (e.g., PRNDL) to the vehicle controller 14.

The navigation system 60 may include a navigation display, a global positioning system (GPS) unit, a navigation controller and inputs (all not shown) for receiving destination information or other data from a driver. These components may be unique to the navigation system 60 or shared with other systems. The navigation system 60 may also communicate distance and/or location information associated with the vehicle 12, its target destinations, or other relevant GPS waypoints.

Figure 2:
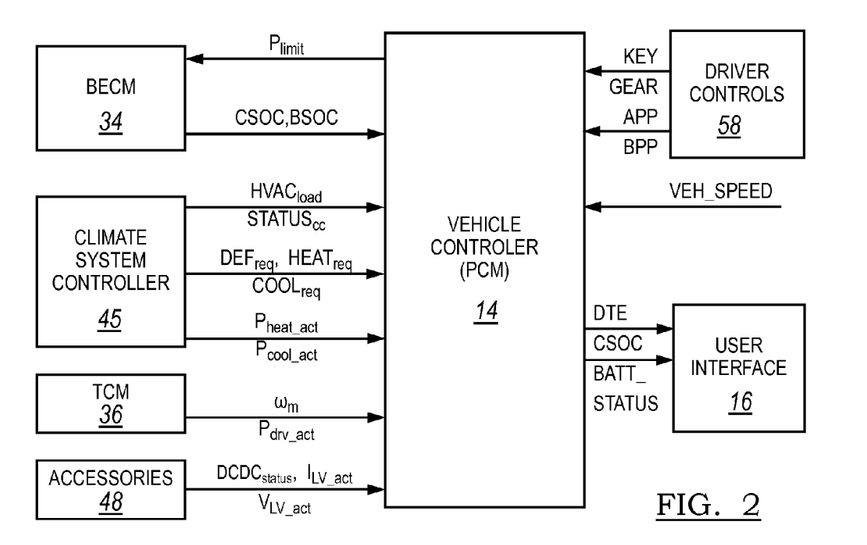
FIG. 2 is an enlarged schematic view of a portion of the vehicle system of FIG. 1, illustrating vehicle communication.

With reference to FIGS. 1 and 2, the vehicle controller 14 receives input that is indicative of current operating conditions of vehicle systems, and provides output to coordinate their function. Each input may be a signal transmitted directly between the vehicle controller 14 and the corresponding vehicle system, or indirectly as input data over the CAN bus 38.

The BECM 34 provides input (BSOC, CSOC) to the vehicle controller 14 that represents the energy level of the main battery 32. The BECM 34 monitors battery conditions such as battery voltage, current, temperature and state of charge measured values. The BECM 34 also compares current battery conditions to historic data to evaluate battery life ("aging"), change in capacity over time, faults, and any predetermined limits. The BSOC input represents the battery state of charge, which is the amount of electric energy of the main battery 32 as a percentage from 0% (empty) to 100% (full). The CSOC input represents the customer state of charge, which is the amount of "available" electric energy of the main battery 32 as a percentage. The relationship between BSOC and CSOC is described in detail below with respect to FIG. 3.

The vehicle controller 14 provides input ($P_{limit}$) to the BECM 34 that represents an allowable battery power limit. During low BSOC conditions the vehicle controller 14 may reduce the allowable battery power limit to conserve battery power and control vehicle shutdown.

The climate controller 45 provides input ($HVAC_{load}$, $STATUS_{cc}$, $HEAT_{req}$, $COOL_{req}$) to the vehicle controller 14 that represent vehicle temperature conditions and driver thermal requests. The $HVAC_{load}$ input represents the electrical load of the climate control system 40 based on temperature conditions inside the vehicle 12. The $HEAT_{req}$ input represents a driver request for heating, and the $COOL_{req}$ input represents a driver request for cooling. The $STATUS_{cc}$ input represents an on/off status of the climate control system 40. The $STATUS_{cc}$, $HEAT_{req}$ and $COOL_{req}$ inputs are each based on a position of an operator actuated switch, knob or dial, which are collectively referred to as thermal controls and illustrated in FIG. 8.

The climate control system 40 also includes a defrost feature where both the PTC heater 42 and HVAC compressor 44 are used to collectively melt ice and remove humidity from a front or rear window (not shown) of the vehicle 12. In one or more embodiments, the climate controller 45 also provides an input ($DEF_{req}$) to the vehicle controller 14 that represents a driver request for defrost.

The vehicle controller 14 receives input ($\omega_m, P_{drv\_act}$) that is indicative of motor 18 conditions. The $\omega_m$ input represents the output speed of the motor 18, and the $P_{drv\_act}$ input represents the actual electrical power provided to the motor 18 to generate drive torque for propelling the vehicle 12.

The vehicle controller receives input ($I_{LV\_act}, V_{LV\_act}$) that represents the actual power usage of the accessories 48. The vehicle 12 includes sensors (not shown) that measure the actual voltage and current that is provided by the main battery 32 to the LV battery 46. These sensors provide the $I_{LV\_act}$ and $V_{LV\_act}$ inputs, which represent the actual current and the actual voltage provided to the LV battery 46, respectively. In other embodiments, the vehicle controller 14 receives an input signal corresponding to the actual power (not shown) that is provided to the LV battery 46. The vehicle controller also receives input ($DCDC_{status}$) that represents the status of the DC-DC converter 54. The $DCDC_{status}$ input includes information regarding which accessories 48 are enabled. For example, in one or more embodiments, the vehicle system 10 may disable certain accessories 48, or all accessories 48 by disconnecting electrical power to the DC-DC converter 54.

The vehicle controller 14 receives input (KEY, GEAR, APP, BPP) from the driver controls 58 that represents the current position of a number of vehicle systems. The KEY input represents the position of the key (e.g., off, run, accessories). The GEAR input represents the gear position or selection (e.g., PRNDL). The APP input represents the accelerator pedal position. The BPP input represents the brake pedal position. The vehicle controller 14 also receives an input (VEH_SPEED) that represents the vehicle speed.

The vehicle controller 14 evaluates the input and provides output (CSOC, DTE, BAT_STATUS) to the user interface 16 that represents battery information such as CSOC and an estimated vehicle travel range, or "distance to empty" (DTE). The user interface 16 may display a message, such as a vehicle shutdown message (FIG. 9) in response to the BAT_STATUS.

Figure 3:
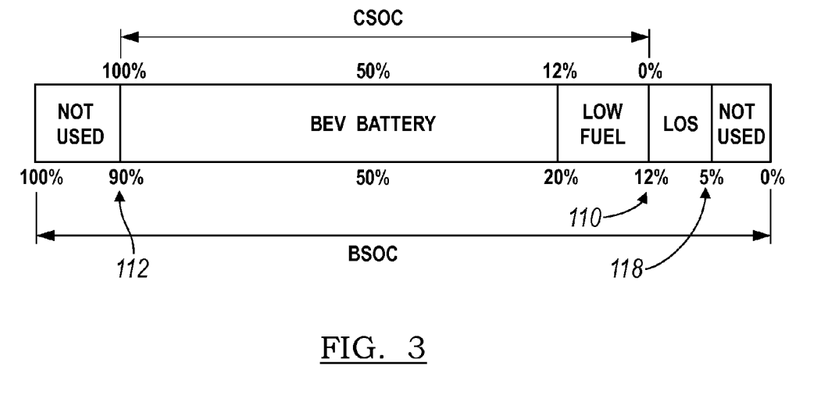
FIG. 3 is a diagram illustrating battery state of charge (BSOC) limits and customer state of charge (CSOC) limits of the vehicle system of FIG. 1.
Figure 9:
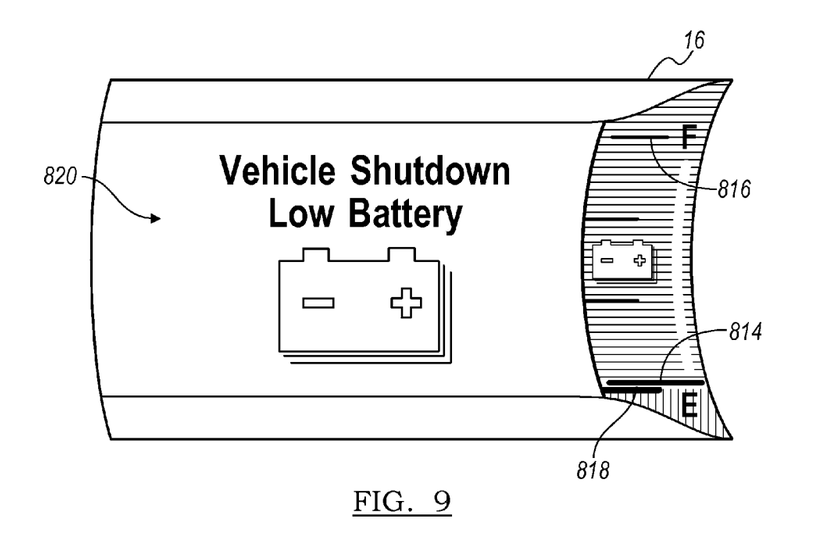
FIG. 9 is an enlarged view of the user interface of FIG. 8 according to one or more embodiments.

FIG. 3 is a diagram illustrating the relationship between battery state of charge (BSOC) and customer state of charge (CSOC). BSOC represents the electric energy of the main battery 32 as a percentage from 0% (empty) to 100% (full). Generally, batteries may be damaged if they are overcharged or overly discharged. Therefore, the main battery 32 is maintained within a reduced operating range during normal operating conditions. In one or more embodiments the reduced operating range is between 12% and 90% BSOC. The 12% BSOC value corresponds to a discharge limit and is referenced by numeral 110. The 90% BSOC value corresponds to a charging limit and is referenced by numeral 112. This battery energy level information is conveyed to the driver visually by the user interface (FIG. 9). The driver uses this energy level information much like a fuel gage on a conventional vehicle. However, this reduced operation range may confuse a driver. Therefore, the vehicle system 10 calculates a customer state of charge (CSOC) which corresponds to the operating range of the BSOC. As shown in FIG. 3, a CSOC value of 0% corresponds to the discharge limit 110 (12% BSOC) and a CSOC value of 100% corresponds to the charging limit 112 (90% BSOC).

Figure 4:
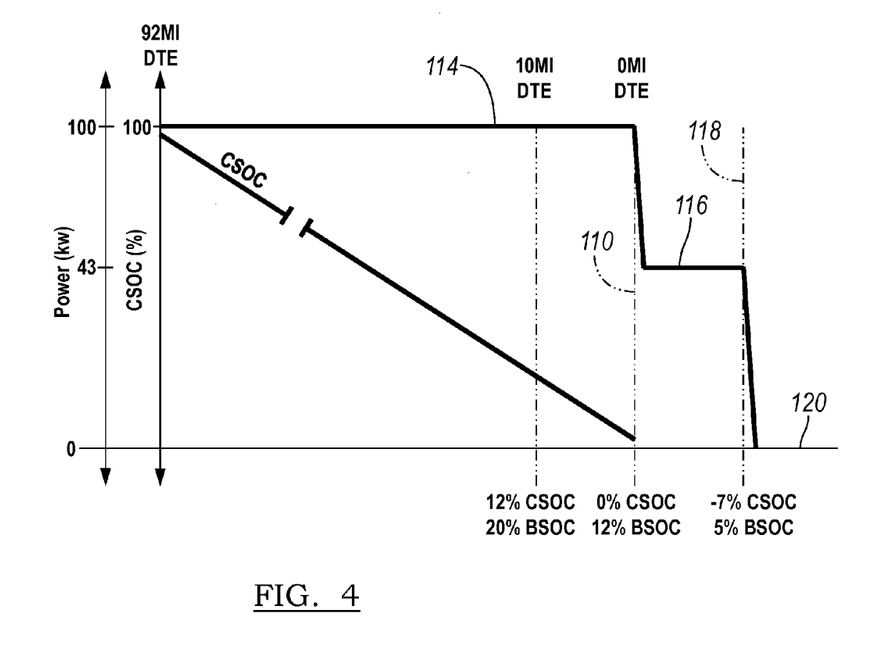
FIG. 4 is a graph illustrating BSOC limits and battery power limits of the vehicle system of FIG. 1.

Referring to FIGS. 3 and 4, the battery 32 may be damaged if operated below the discharge limit 110 at high battery power levels. However, the battery 32 may operate below the discharge limit 110 at a reduced battery power level for a short distance (e.g., five to seven miles) without damaging the battery 32. To extend the overall vehicle travel range, the vehicle system 10 initiates a limited operating strategy (LOS) once the BSOC reaches the discharge limit 110. During LOS, the vehicle system 10 limits battery power from a full power limit (approximately 100 KW), which is referenced by numeral 114, to an intermediate power limit (approximately 43 KW), which is referenced by numeral 116. The vehicle system 10 reduces the battery power limit from full power limit 114 to intermediate power limit 116 at a ramp rate of approximately 5 KW/s. During LOS, the vehicle system 10 selectively reduces, or "sheds", electrical power usage to extend battery life and travel range without damaging the battery 32, so that the driver can maneuver the vehicle to the nearest charging station.

A maximum discharge limit is referenced by numeral 118. The battery 32 may be damaged if operated below the maximum discharge limit 118. Therefore the vehicle system 10 initiates a controlled shutdown of the vehicle 12 when the BSOC is less than the maximum discharge limit 118. The maximum discharge limit is between 6% and 3% BSOC, according to one or more embodiment. The maximum discharge limit is 5% BSOC in the illustrated embodiment. The vehicle system 10 reduces the battery power limit from the intermediate power limit 116 to shutdown (e.g., 0 KW), which is referenced by numeral 120, at a ramp rate of approximately 5 KW/s.

Figure 5:
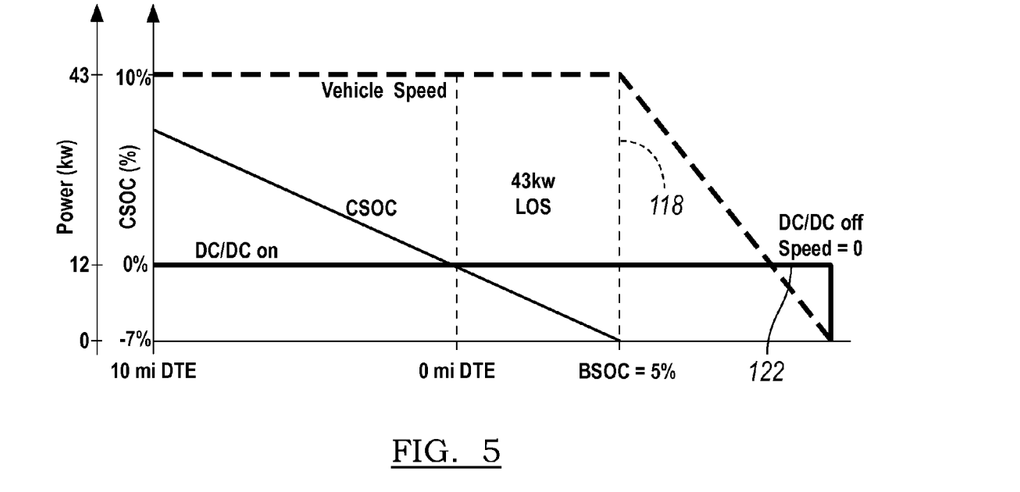
FIG. 5 is a graph illustrating the battery power limits of FIG. 4 during regenerative braking.

With reference to FIG. 5, the vehicle system 10 will activate regenerative braking at the maximum discharge limit 118, according to one or more embodiments. During a controlled shutdown of the vehicle 12, the vehicle system 10 reduces the battery power limit from the intermediate power limit 116 to shutdown 120 (e.g., 0 KW). However, during this shutdown period the vehicle system 10 activates regenerative braking, regardless of actual accelerator pedal position, by controlling the motor 18 to generate energy while decelerating (braking) the vehicle 12. The vehicle system 10 provides the energy supplied by the regenerative braking to the DC-DC converter 54 for use by the electric braking actuator 50 and the electric steering actuator 52. As illustrated by point 122 in FIG. 5, this energy from regenerative braking extends the functionally of the electric braking actuator 50 and the electric steering actuator 52 while the vehicle 12 is moving, even if the battery power limit has already been reduced to a lower level.

Figure 6:
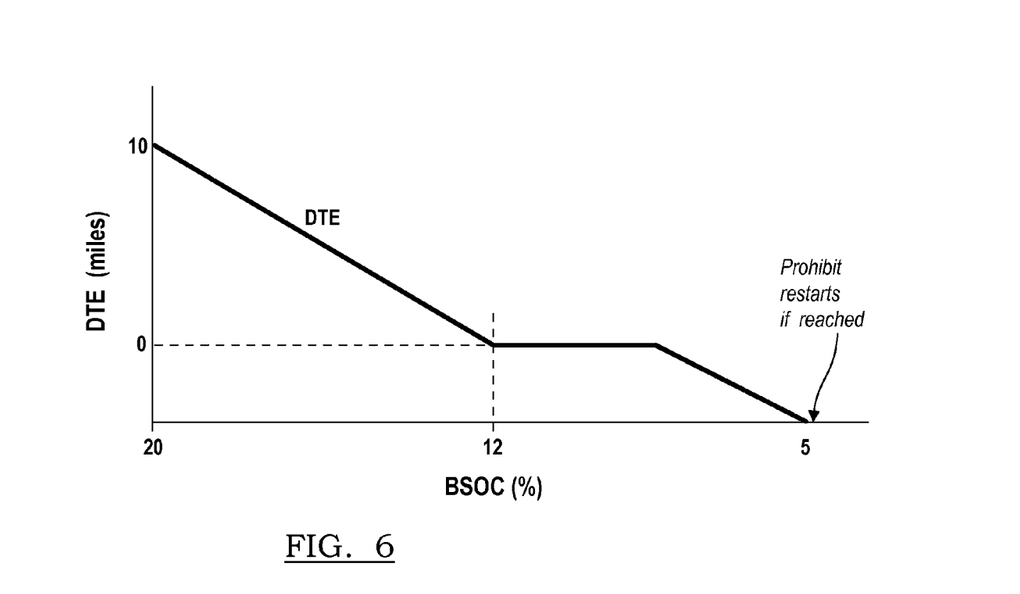
FIG. 6 is another graph illustrating BSOC limits.

Referring to FIG. 6, the vehicle system 10 prohibits restarting the vehicle 12 after shutdown, according to one or more embodiments. Users of electrical systems (e.g., cellphones, laptop computers, etc.) often try to restart the electrical system after a forced system shutdown due to low battery energy. Such restarts may damage a battery. To avoid a similar situation on the vehicle 12, the vehicle system prohibits a restart of the vehicle 12 until the BSOC is above a restart limit. The restart limit is between 12% and 6% BSOC according to one or more embodiments. The restart limit is 7% BSOC according to the illustrated embodiment. The difference between the restart limit (7% BSOC) and the maximum discharge limit (5% BSOC) allows for some hysteresis or variation in the BSOC calculation.

Figure 7:
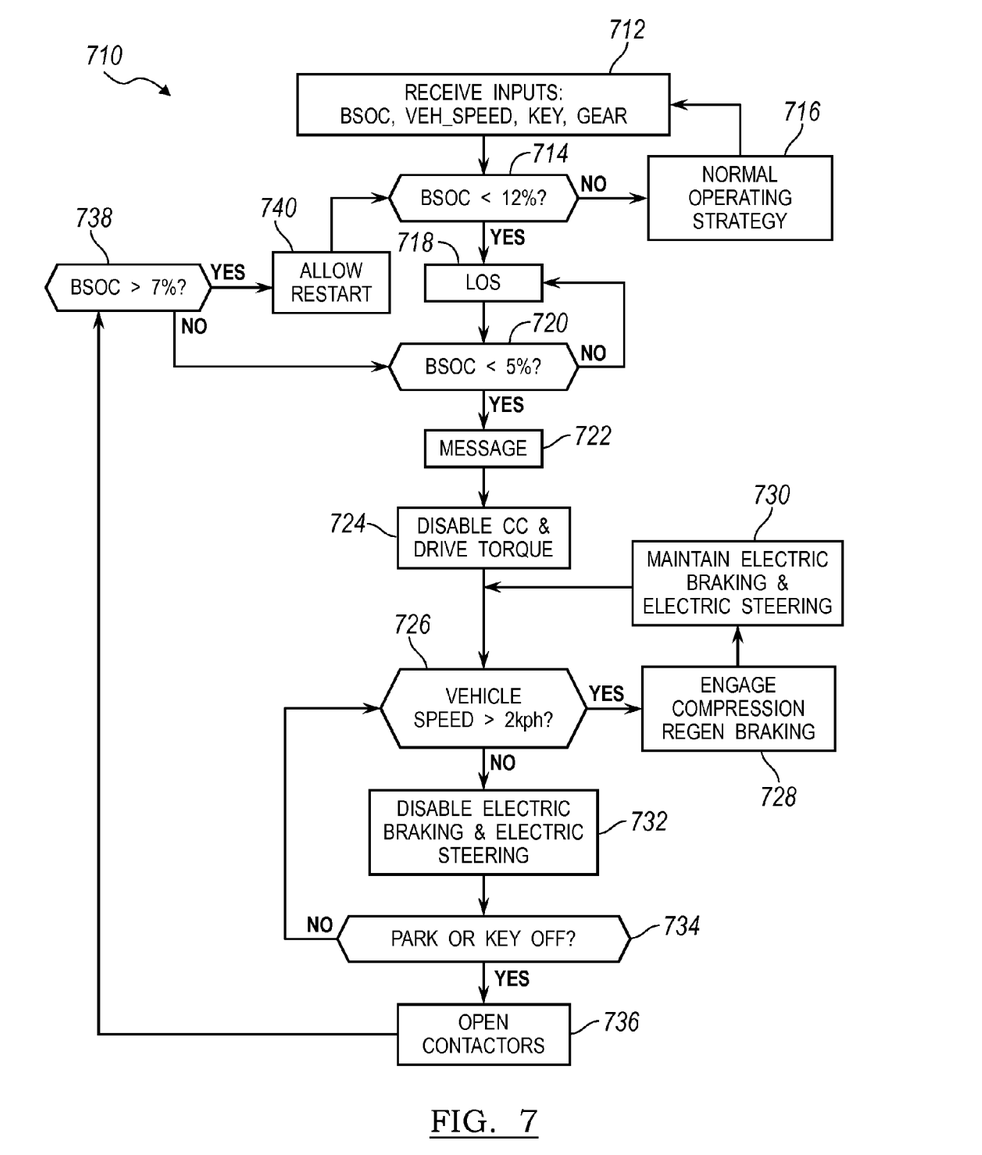
FIG. 7 is a flow chart illustrating a method for controlling the shutdown of an electric vehicle according to one or more embodiments.

With reference to FIG. 7 a method for controlling the shutdown of the electric vehicle 12 of FIG. 1 is illustrated according to one or more embodiments and generally referenced by numeral 710. The method 710 is implemented using software code contained within the vehicle controller 14 according to one or more embodiments.

In operation 712 the vehicle controller 14 receives input including the battery state of charge (BSOC), the vehicle speed (VEH_SPEED), the key position (KEY) and the gear selection (GEAR). In operation 714 the BSOC value is compared to the discharge limit (12% BSOC). If the BSOC value is greater than the discharge limit, then the vehicle controller 14 proceeds to operation 716 and applies a normal battery operating strategy. For example the battery power may be limited to approximately 100 kW at operation 716. If the determination at operation 714 is positive, the vehicle controller 14 proceeds to operation 718 and applies a limited operating strategy (LOS). For example the battery power may be limited to approximately 43 kW at operation 718.

In operation 720 the BSOC value is compared to the maximum discharge limit (5% BSOC). If the BSOC value is greater than the maximum discharge limit, then the vehicle controller 14 returns to operation 718 and applies the LOS. If the determination at operation 720 is positive, the vehicle controller 14 proceeds to operation 722 and initiates a vehicle shutdown strategy.

In operation 722 the vehicle controller 14 provides a battery status warning to the interface 16, which is conveyed to the driver (as shown in FIG. 9). In operation 724, the vehicle controller 14 disables the climate control system 40 and the motor drive torque by reducing the battery power limit to zero KW.

In operation 726 the vehicle controller 14 compares the vehicle speed (VEH_SPEED) to a predetermined speed value. The predetermined speed value is between 5 and 0 kph according to one or more embodiments. The predetermined speed value is 2 kph in the illustrated embodiment. If the vehicle speed is greater than the predetermined speed value, then the vehicle controller proceeds to operation 728 and activates compression braking and/or regenerative braking. The energy generated by operation 728 is utilized to maintain the electric braking assistance and the electric steering assistance in operation 730. If the determination at operation 726 is negative, then the electric braking assistance and the electric steering assistance are disabled at operation 732.

In operation 734 the vehicle controller 14 analyzes the gear selection signal (GEAR) and the key position signal (KEY). If GEAR indicates that the vehicle 12 is in "park", or KEY indicates that the key is "off", then the vehicle controller 14 proceeds to operation 736 and opens electrical contactors within the battery 32. By opening the electrical contactors the battery 32 is electrically disconnected from other vehicle components and subsystems, except for the AC charger 56. If the determination at operation 734 is negative, the vehicle controller 14 returns to operation 726.

In operation 738 the vehicle controller 14 analyzes the BSOC value to determine if the battery 32 has been recharged. If the BSOC value is greater than 7% BSOC, the vehicle controller proceeds to operation 740 and allows the driver to restart the vehicle. Then the vehicle controller returns to operation 714. If the determination at operation 738 is negative, the vehicle controller 14 returns to operation 720.

Figure 8:
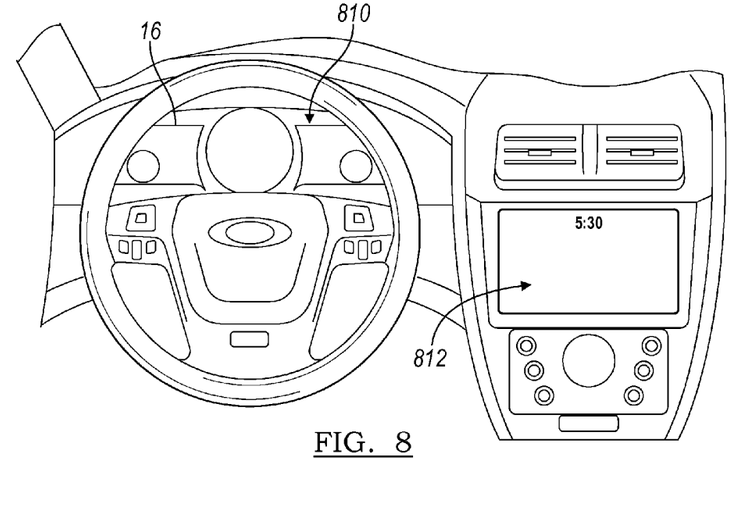
FIG. 8 is a front perspective view of a user interface of the vehicle system of FIG. 1.

With reference to FIG. 8, the user interface 16 is located within an instrument cluster 810 according to one or more embodiments. In other embodiments, the user interface may be located in a central portion of a dashboard 812 ("center-stack"). The user interface 16 may be a liquid crystal display (LCD), a plasma display, an organic light emitting display (OLED), or any other suitable display. The user interface 16 may include a touch screen or one or more buttons (not shown), including hard keys or soft keys, located adjacent the user interface 16 for effectuating driver input.

With reference to FIG. 9, the user interface 16 conveys information, such as the customer state of charge CSOC. In the illustrated embodiment, the CSOC is conveyed pictorially as a gage where the discharge limit (0% CSOC) is represented by the letter "E" for "Empty" and by a horizontal line, referenced by numeral 814. The charging limit (100% CSOC) is represented by the letter "F" for "Full" and by a horizontal line referenced by numeral 816. The present energy level of the battery 32 in the illustrated embodiment is below the maximum discharge limit (5% BSOC, −7% CSOC) and is represented by horizontal line and referenced by numeral 818, which is below the discharge limit 814. As mentioned above with respect to FIG. 7, the vehicle controller 14 provides a warning message to the interface 16 when the battery 32 reaches a BSOC that is less than the maximum discharge limit (5% BSOC). This warning message may be conveyed to the driver both pictorially and using text as generally referenced by numeral 820.

As such the vehicle system 10 provides advantages by allowing the electric vehicle 12 to operate below the discharge limit which extends the battery range. The vehicle system 10 controls the shutdown of the electric vehicle 12 once the BSOC is less than a maximum discharge limit by disabling vehicle propulsion systems and activating regenerative braking to provide energy for electric braking assistance and electric steering assistance features While embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
 a motor configured to provide drive torque and to facilitate regenerative braking; and
 a controller configured to:
 receive input indicative of a vehicle speed and a battery state of charge (BSOC),
 disable the drive torque when the BSOC is less than a maximum discharge limit, wherein the maximum discharge limit is between 6% and 3% BSOC, and
 activate regenerative braking only when the BSOC is less than the maximum discharge limit and the vehicle speed is greater than a predetermined speed.

2. The vehicle of claim 1 further comprising:
 an electric braking actuator for assisting a friction braking system; and
 an electric steering actuator for assisting a steering system;
 wherein the controller is further configured to disable the electric braking actuator and the electric steering actuator when the BSOC is less than the maximum discharge limit and the vehicle speed is less than the predetermined speed.

3. The vehicle of claim 2 further comprising:
 a climate control system; and
 a battery for providing electrical energy to the motor, the climate control system, the electric braking actuator and the electric steering actuator;
 wherein the controller is further configured to disable the climate control system when the BSOC is less than the maximum discharge limit.

4. The vehicle of claim 1 wherein the predetermined speed is between 5 and 0 kph.

5. The vehicle of claim 1 further comprising:
 an interface communicating with the controller and configured to display a warning message when the BSOC is less than the maximum discharge limit.

6. The vehicle of claim 1 wherein the controller is further configured to:
 limit the drive torque when the BSOC is less than a discharge limit and greater than the maximum discharge limit.

7. The vehicle of claim 6 wherein the discharge limit is approximately 12% BSOC.

8. A vehicle system comprising:
 a controller configured to:
 receive input indicative of a vehicle speed and a battery state of charge (BSOC),
 disable drive torque responsive to the BSOC decreasing below a maximum discharge limit of between 6% and 3% BSOC, and
 disable electric braking assistance and electric steering assistance when the BSOC is less than the maximum discharge limit and the vehicle speed is less than a predetermined speed.

9. The vehicle system of claim 8 wherein the controller is further configured to disable drive torque by decreasing an available battery power limit to 0 KW at a controlled ramp rate.

10. The vehicle system of claim 8 wherein the controller is further configured to:
 activate regenerative braking when the BSOC is less than the maximum discharge limit and the vehicle speed is greater than the predetermined speed.

11. The vehicle system of claim 8 wherein the controller is further configured to:
 disable a climate control system when the BSOC is less than the maximum discharge limit.

12. The vehicle system of claim 8 further comprising:
an interface communicating with the controller and configured to display a vehicle shutdown message when the BSOC is less than the maximum discharge limit.

13. The vehicle system of claim 8 wherein the controller is further configured to:
receive input indicative of a gear selection and a key position; and
electrically disconnect a battery from a motor in response to at least one of a gear selection of park and a key position of off.

14. A vehicle system comprising:
a controller configured to:
receive input indicative of a vehicle speed, a key position and a battery state of charge (BSOC),
disable drive torque in response to the BSOC being less than a first discharge limit,
activate regenerative braking only in response to the BSOC being less than the first discharge limit and the vehicle speed being greater than a predetermined speed,
electrically disconnect a battery from a motor in response to a key position of off, and
upon electrically disconnecting the battery, electrically reconnect the battery to the motor in response to the BSOC increasing above a second discharge limit to allow vehicle restart, the second discharge limit being greater than the first discharge limit.

15. The vehicle system of claim 14 wherein the controller is further configured to:
supply energy generated during regenerative braking to an electric braking actuator for providing braking assistance.

16. The vehicle system of claim 14 wherein the controller is further configured to:
supply energy generated during regenerative braking to an electric steering actuator for providing steering assistance.

17. The vehicle system of claim 14 wherein the controller is further configured to:
disable an electric brake actuator and an electric steering actuator in response to the BSOC being less than the first discharge limit and the vehicle speed being less than a predetermined speed.

18. The vehicle system of claim 14 wherein the controller is further configured to:
disable a climate control system in response to the BSOC being less than the first discharge limit.

19. The vehicle system of claim 14 wherein the controller is further configured to:
display a vehicle shutdown message in response to the BSOC being less than the first discharge limit.

20. The vehicle system of claim 14 wherein the controller is further configured to:
receive input indicative of a gear selection; and
electrically disconnect a battery from at least one of a motor and a climate control system in response to a gear selection of park.

* * * * *